US011675916B2

(12) United States Patent
Saad et al.

(10) Patent No.: US 11,675,916 B2
(45) Date of Patent: Jun. 13, 2023

(54) METHOD AND SYSTEM FOR LIMITING DATA ACCESSIBILITY IN COMPOSED SYSTEMS

(71) Applicant: Dell Products L.P., Hopkinton, MA (US)

(72) Inventors: Yossef Saad, Ganei Tikva (IL); Mark Steven Sanders, Roanoke, VA (US); Gaurav Chawla, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/160,597

(22) Filed: Jan. 28, 2021

(65) Prior Publication Data

US 2022/0237306 A1   Jul. 28, 2022

(51) Int. Cl.
*G06F 21/62* (2013.01)
*G06F 21/52* (2013.01)

(52) U.S. Cl.
CPC .............. *G06F 21/62* (2013.01); *G06F 21/52* (2013.01); *G06F 2221/033* (2013.01)

(58) Field of Classification Search
CPC ..... G06F 21/50–577; G06F 21/60–629; G06F 2221/033; G06F 2221/2141
See application file for complete search history.

(56) References Cited

U.S. PATENT DOCUMENTS

| 7,478,117 | B1 | 1/2009 | Lamb et al. |
| 7,606,892 | B2 | 10/2009 | Piet et al. |
| 7,620,984 | B2 | 11/2009 | Kallahalla |
| 8,095,929 | B1 | 1/2012 | Ji et al. |
| 8,276,140 | B1 | 9/2012 | Beda, III et al. |

(Continued)

FOREIGN PATENT DOCUMENTS

TW    I613602 B    2/2018

OTHER PUBLICATIONS

Alachiotis, Nikolaos, et al. "dReDBox: A disaggregated architectural perspective for data centers." Hardware Accelerators in Data Centers. Springer, Cham, 2019. 35-56. (Year: 2019).*

(Continued)

*Primary Examiner* — Madhuri R Herzog
(74) *Attorney, Agent, or Firm* — Chamberlain, Hrdlicka, White, Williams & Aughtry

(57) ABSTRACT

A system for managing composed information handling systems to manage access to data by applications hosted by the composed information handling systems includes a system control processor that instantiates a composed information handling system using a compute resource set that hosts applications and a hardware resource set that stores a portion of the data, associates, using authorization information, storage areas of the at least one hardware resource set with the applications to obtain storage area associations, obtains a data access request from the compute resource set for the portion of the data which is stored in a storage area of the storage areas, makes a determination, based on the storage area associations and an initiator of the data access request, that the initiator of the data access request is not authorized to access the portion of the data, and refuses to service the data access request.

20 Claims, 16 Drawing Sheets

(56) References Cited

U.S. PATENT DOCUMENTS

| | | |
|---|---|---|
| 8,285,747 B1 | 10/2012 | English |
| 8,306,948 B2 | 11/2012 | Chou |
| 8,499,066 B1 | 7/2013 | Zhang et al. |
| 8,589,659 B1 | 11/2013 | Shapiro |
| 8,606,920 B1 | 12/2013 | Gupta et al. |
| 8,997,242 B2 | 3/2015 | Chen |
| 9,104,844 B2 | 8/2015 | Fang |
| 9,105,178 B2 | 8/2015 | Carlson |
| 9,245,096 B2 | 1/2016 | Abuelsaad |
| 9,569,598 B2 | 2/2017 | Abuelsaad |
| 9,613,147 B2 | 4/2017 | Carlson |
| 9,678,977 B1 | 6/2017 | Aronovich |
| 9,959,140 B2 | 5/2018 | Jackson |
| 10,348,574 B2 | 7/2019 | Kulkarni |
| 10,382,279 B2 | 8/2019 | Roese |
| 10,601,903 B2 | 3/2020 | Bivens |
| 10,628,225 B2 | 4/2020 | Yamato |
| 10,756,990 B1 | 8/2020 | Chakkassery Vidyadharan et al. |
| 10,782,882 B1 | 9/2020 | Wu |
| 10,795,856 B1 | 10/2020 | Smith et al. |
| 10,909,283 B1 | 2/2021 | Wang et al. |
| 10,994,198 B1 | 5/2021 | Byskal et al. |
| 11,119,739 B1 | 9/2021 | Allen et al. |
| 11,134,013 B1 | 9/2021 | Allen et al. |
| 11,221,886 B2 * | 1/2022 | Bivens ................ G06F 11/3414 |
| 2003/0028642 A1 | 2/2003 | Agarwal et al. |
| 2003/0061262 A1 | 3/2003 | Hahn et al. |
| 2003/0233427 A1 | 12/2003 | Taguchi |
| 2004/0257998 A1 | 12/2004 | Chu et al. |
| 2006/0082222 A1 | 4/2006 | Pincu et al. |
| 2006/0230407 A1 | 10/2006 | Rosu et al. |
| 2006/0236100 A1 * | 10/2006 | Baskaran ............... G06F 21/565 713/165 |
| 2008/0052480 A1 | 2/2008 | Satoyama et al. |
| 2008/0313476 A1 | 12/2008 | Hansen |
| 2009/0199193 A1 | 8/2009 | Jackson |
| 2010/0217865 A1 | 8/2010 | Ferris |
| 2011/0099147 A1 | 4/2011 | Mcalister et al. |
| 2011/0154500 A1 | 6/2011 | Sahita et al. |
| 2011/0307570 A1 | 12/2011 | Speks |
| 2012/0047328 A1 | 2/2012 | Williams et al. |
| 2013/0007710 A1 | 1/2013 | Vedula et al. |
| 2013/0332901 A1 | 12/2013 | Berg et al. |
| 2013/0346718 A1 | 12/2013 | Meshchaninov et al. |
| 2014/0007097 A1 | 1/2014 | Chin et al. |
| 2014/0149635 A1 | 5/2014 | Bacher et al. |
| 2014/0165063 A1 | 6/2014 | Shiva et al. |
| 2014/0223233 A1 | 8/2014 | Heyrman et al. |
| 2014/0282820 A1 * | 9/2014 | Walton .................... G06F 21/53 726/1 |
| 2014/0359356 A1 | 12/2014 | Aoki |
| 2015/0106165 A1 | 4/2015 | Rai et al. |
| 2015/0220455 A1 * | 8/2015 | Chen .................... G06F 12/1408 711/163 |
| 2015/0317173 A1 | 11/2015 | Anglin |
| 2016/0062441 A1 | 3/2016 | Chou et al. |
| 2016/0180087 A1 | 6/2016 | Edwards et al. |
| 2016/0224903 A1 | 8/2016 | Talathi et al. |
| 2016/0259665 A1 | 9/2016 | Gaurav et al. |
| 2017/0041184 A1 | 2/2017 | Broz et al. |
| 2017/0048200 A1 | 2/2017 | Chastain |
| 2017/0097851 A1 | 4/2017 | Chen |
| 2017/0118247 A1 | 4/2017 | Hussain |
| 2017/0195201 A1 | 7/2017 | Mueller et al. |
| 2018/0024964 A1 | 1/2018 | Mao |
| 2018/0063145 A1 | 3/2018 | Cayton et al. |
| 2019/0065061 A1 | 2/2019 | Kim et al. |
| 2019/0065256 A1 | 2/2019 | Hamilton et al. |
| 2019/0164087 A1 | 5/2019 | Ghibril et al. |
| 2019/0188014 A1 | 6/2019 | Easterling et al. |
| 2019/0190778 A1 | 6/2019 | Easterling et al. |
| 2019/0205180 A1 | 7/2019 | Macha et al. |
| 2019/0227616 A1 | 7/2019 | Jenne et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1 | 12/2019 | Bernat |
| 2019/0384648 A1 | 12/2019 | Wiggers et al. |
| 2019/0386902 A1 | 12/2019 | Mueller et al. |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0034528 A1 * | 1/2020 | Yang ................... G06F 21/6209 |
| 2020/0044966 A1 | 2/2020 | Krishnan et al. |
| 2020/0065254 A1 | 2/2020 | Cao et al. |
| 2020/0097358 A1 | 3/2020 | Mahindru et al. |
| 2020/0174949 A1 | 6/2020 | Ramasamy et al. |
| 2020/0218561 A1 | 7/2020 | Lal et al. |
| 2020/0233582 A1 | 7/2020 | Chen et al. |
| 2020/0293375 A1 | 9/2020 | Klein |
| 2020/0341786 A1 | 10/2020 | Soryal |
| 2020/0341798 A1 | 10/2020 | Duleba |
| 2020/0356200 A1 | 11/2020 | Blanco et al. |
| 2020/0358714 A1 | 11/2020 | Singleton, IV et al. |
| 2021/0019062 A1 * | 1/2021 | Fessel .................... G06F 3/0622 |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1 | 4/2021 | Cui et al. |
| 2021/0117441 A1 | 4/2021 | Patel et al. |
| 2021/0152659 A1 | 5/2021 | Cai et al. |
| 2021/0224093 A1 | 7/2021 | Fu et al. |
| 2021/0367901 A1 | 11/2021 | Singh et al. |
| 2021/0397494 A1 | 12/2021 | Graham |
| 2022/0179701 A1 | 6/2022 | Saad et al. |
| 2022/0197773 A1 | 6/2022 | Butler et al. |

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, dated Aug. 19, 2021, 13 pages.

International Searching Authority, International Search Report Written Opinion dated Jul. 19, 2021, issued in corresponding PCT Application No. PCT/US2021/029687, 11 pages.

International Searching Authority, International Search Report Written Opinion of corresponding PCT Application No. PCT/US2021/029698, dated Aug. 9, 2021, 15 pages.

Chunlin, Li et al., "Hybrid Cloud Adaptive Scheduling Strategy for Heterogeneous Workloads", Journal of Grid Computing 17, pp. 419-446, (Year: 2019) (28 pages).

International Search Report and Written Opinion of the International Searching Authority dated Aug. 19, 2021, issued in corresponding PCT Application No. PCT/US2021/029702 (13 pages).

International Search Report and Written Opinion of the International Searching Authority dated Aug. 9, 2021, issued in corresponding PCT Application No. Application No. PCT/US2021/029698 (15 pages).

International Search Report and Written Opinion of the International Searching Authority dated Jul. 19, 2021, issued in corresponding PCT Application No. PCT/US2021/029687 (11 pages).

International Search Report and Written Opinion of the International Searching Authority dated Oct. 21, 2021, issued in corresponding PCT Application No. PCT/US2021/029708 (12 pages).

Taiwanese Office Action dated Oct. 31, 2022, issued in the corresponding Taiwanese Patent Application No. 110125303 with an English translation of Search Report (7 pages).

Mohammadi et al., "Towards an End-to-End Architecture for Runtime Data Protection in the Cloud", 2018 44th Euromicro Confer-

(56) References Cited

OTHER PUBLICATIONS ence on Software Engineering and Advanced Applications (SEAA), IEEE, pp. 514-518. (Year 2018).

* cited by examiner

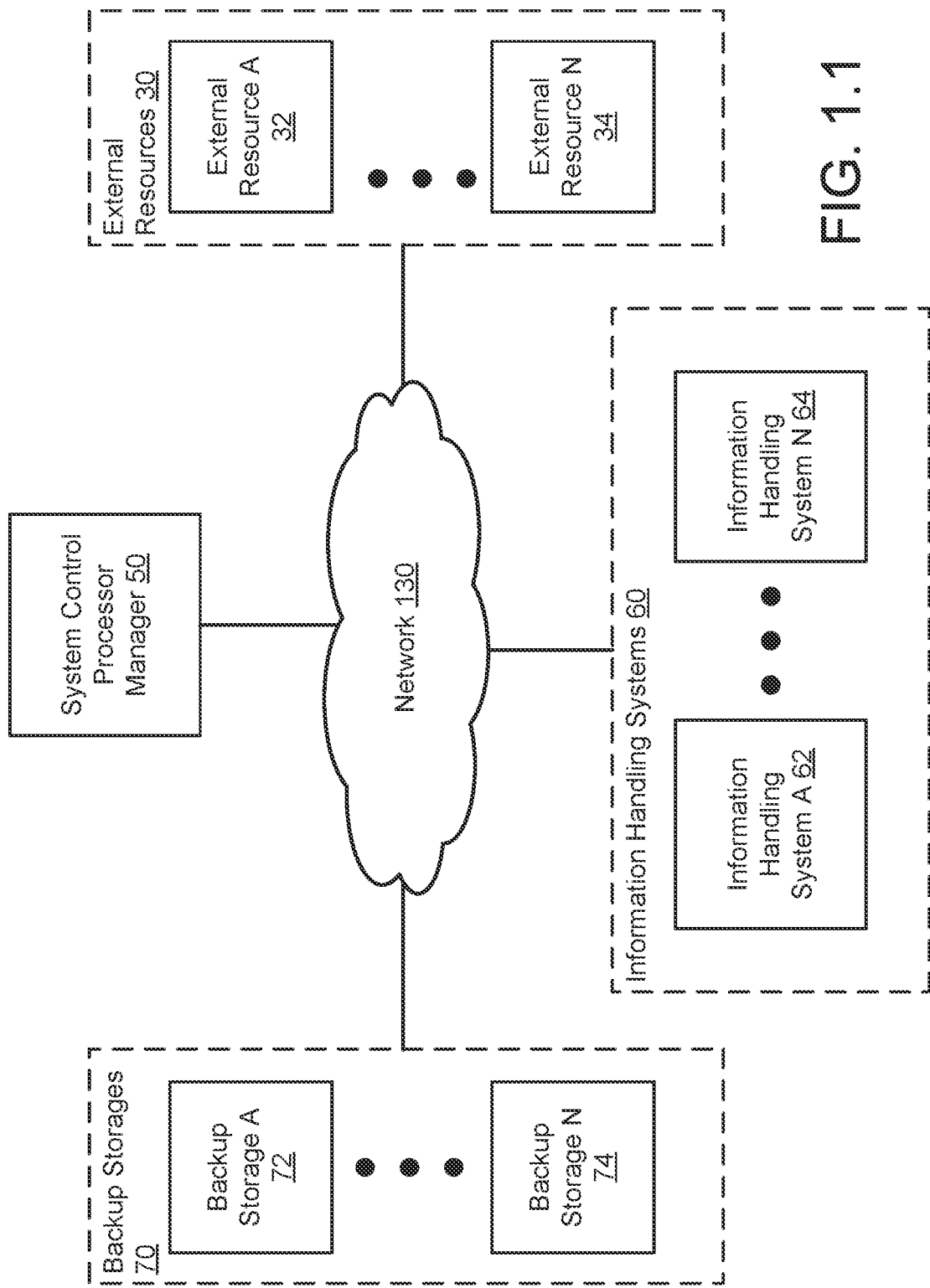
FIG. 1.1

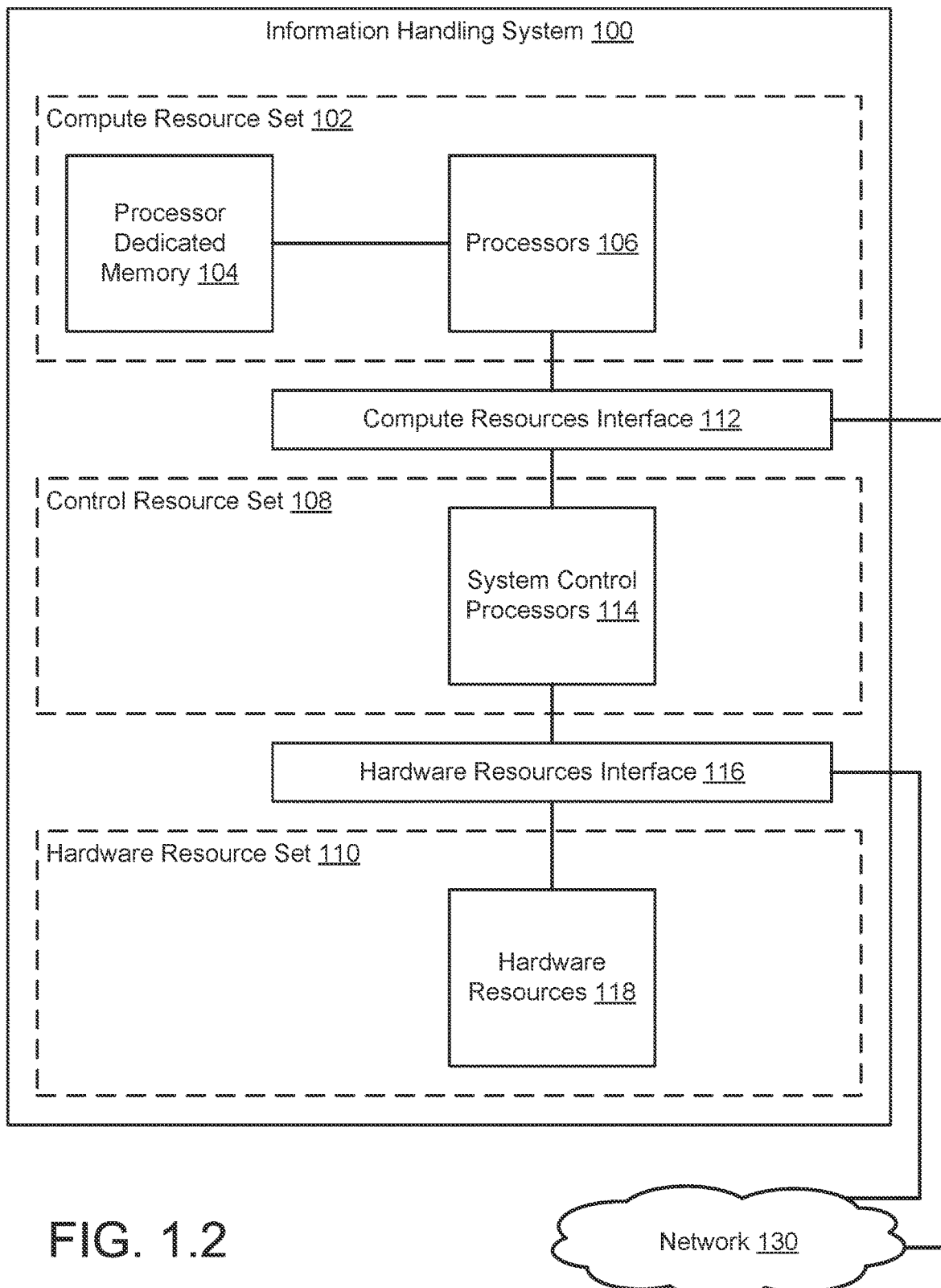
FIG. 1.2

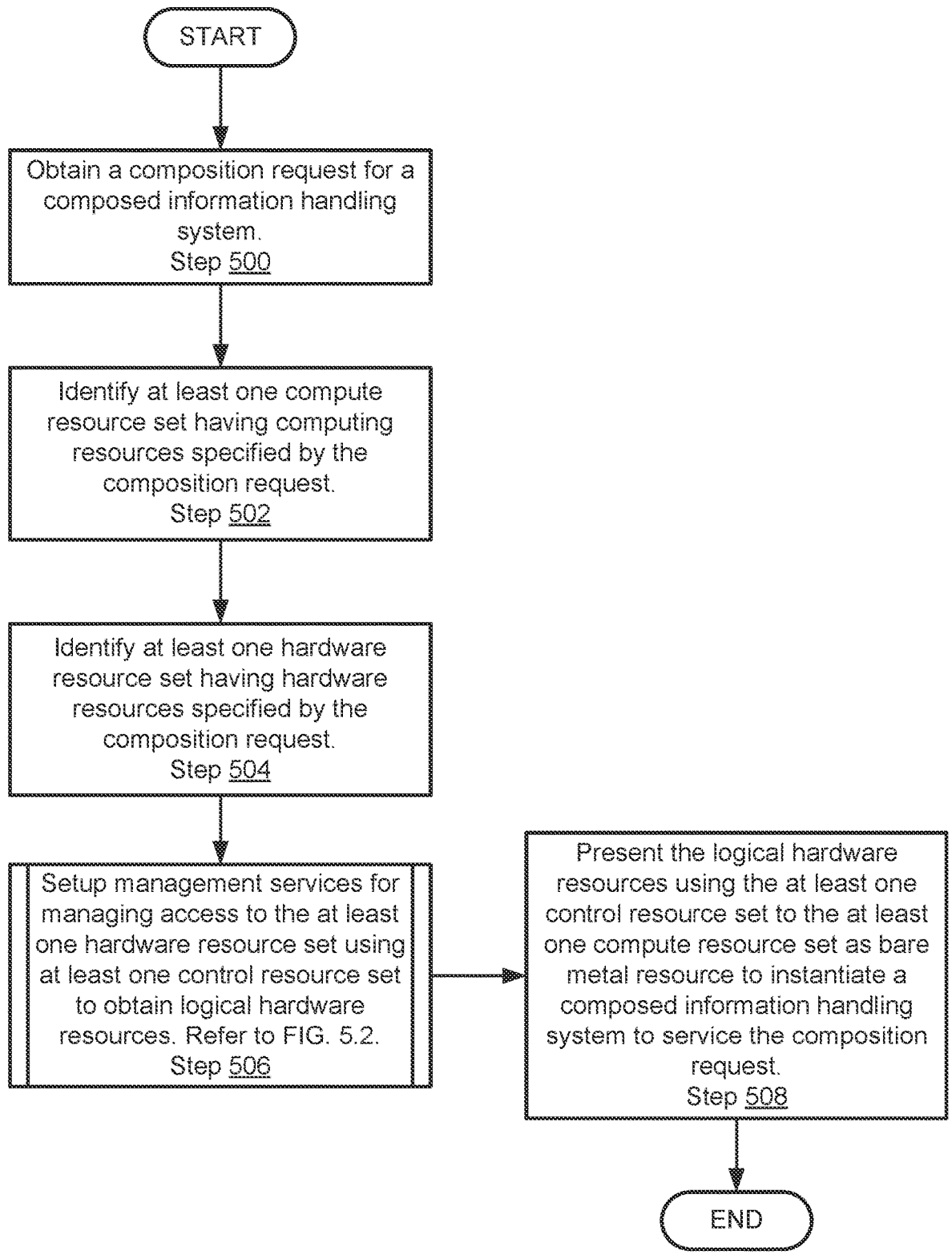
FIG. 5.1

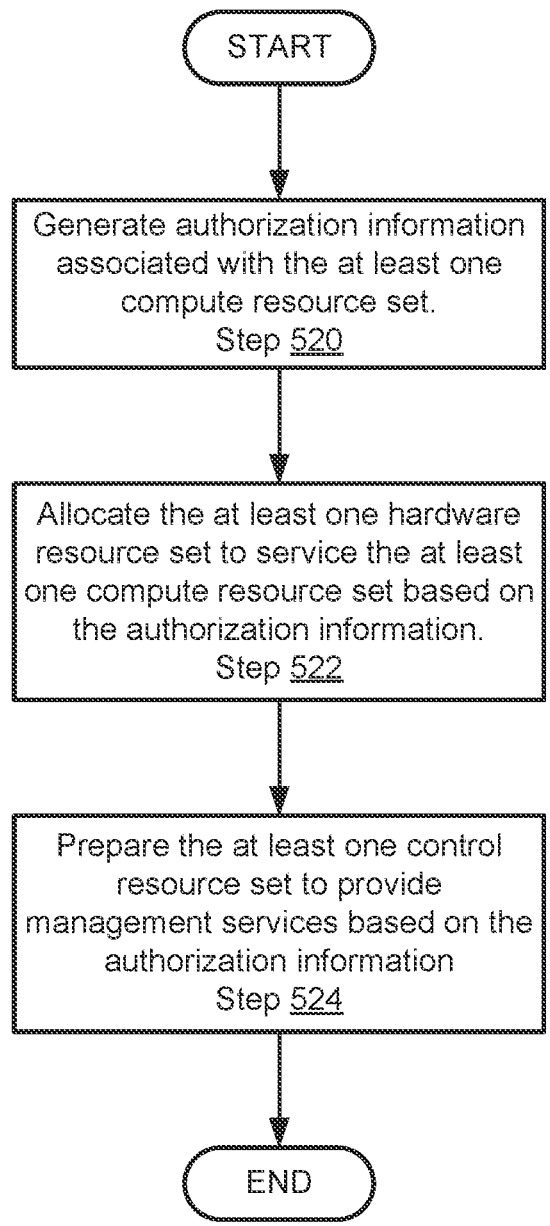
FIG. 5.2

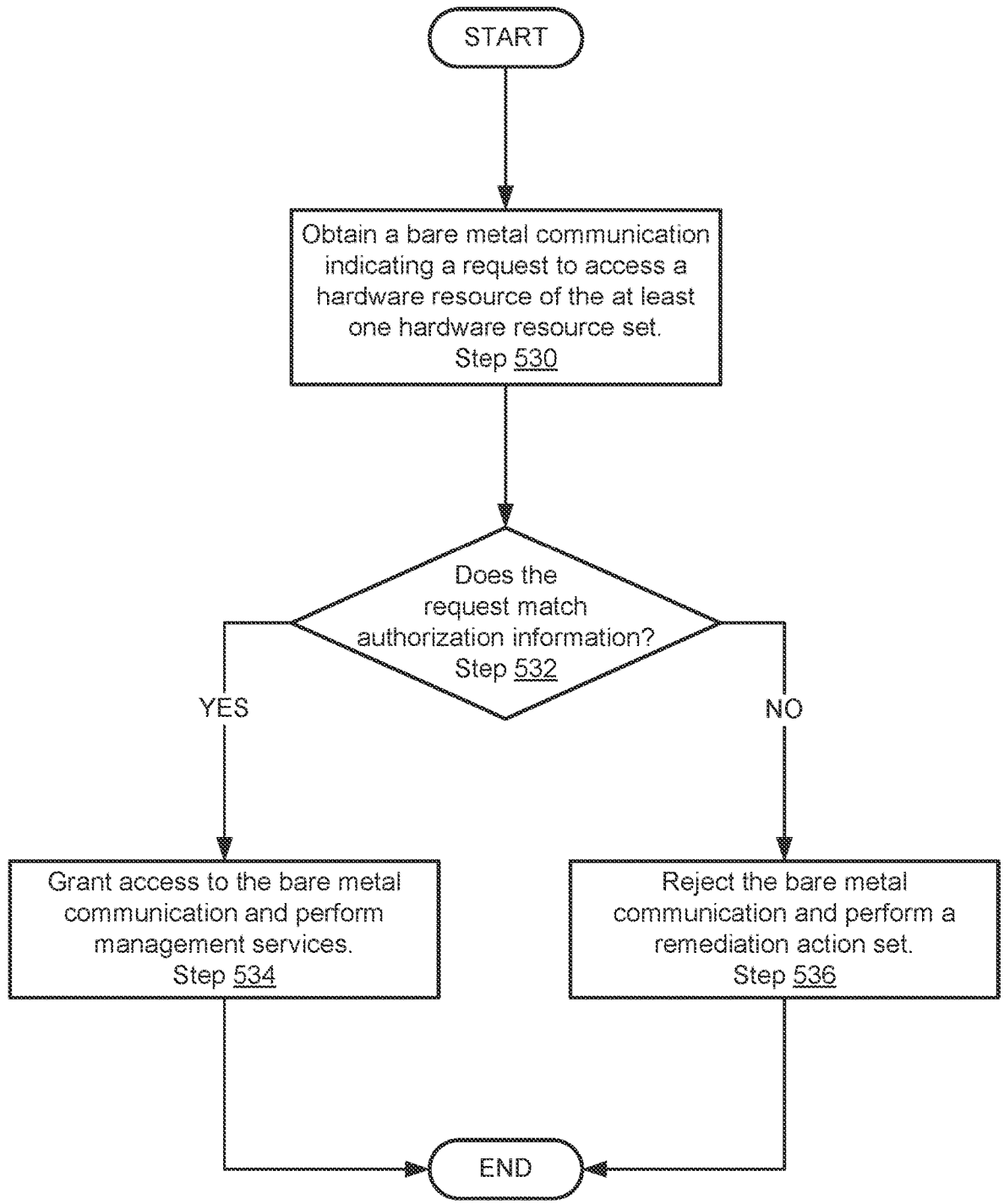
FIG. 5.3

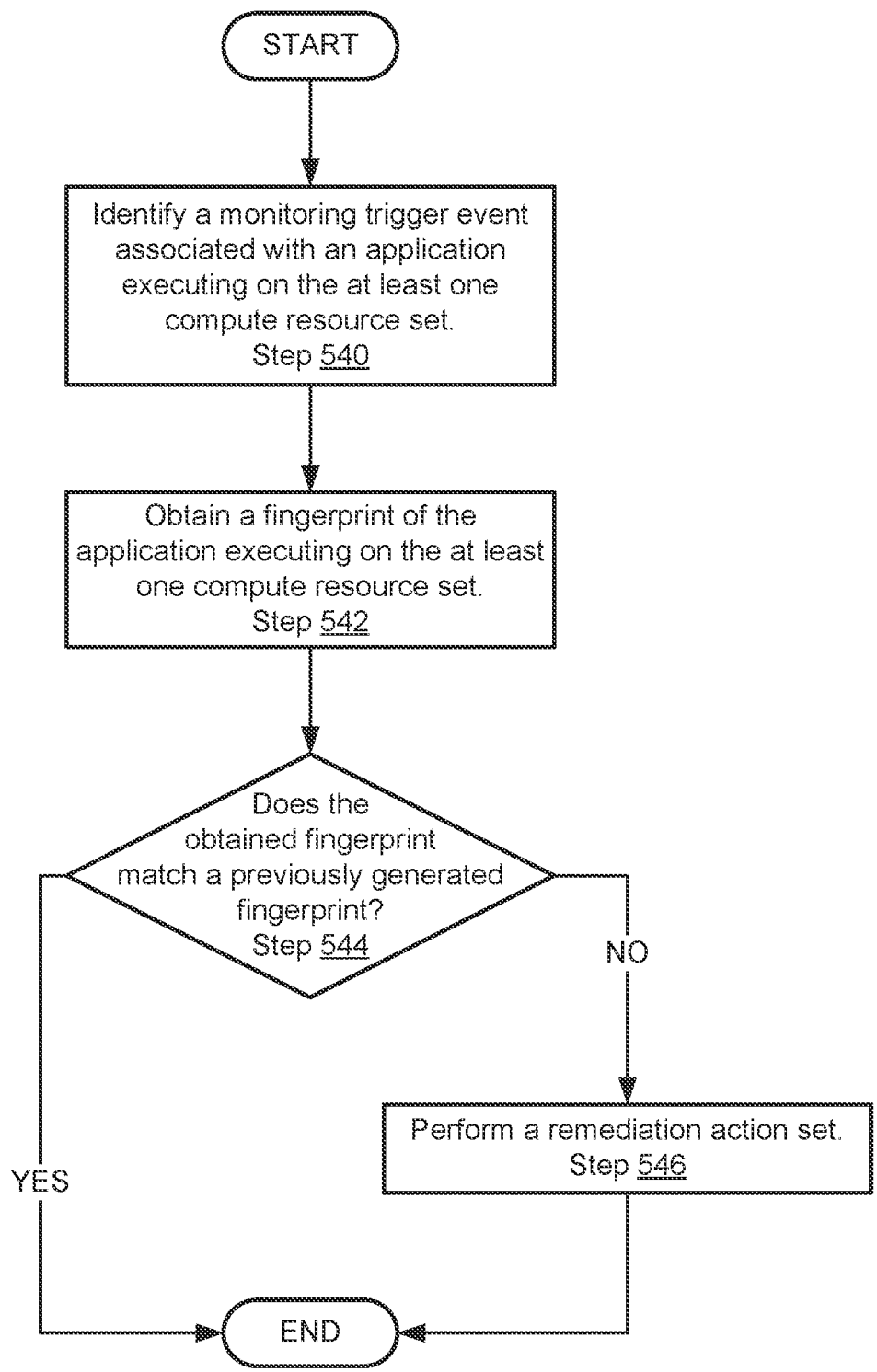
FIG. 5.4

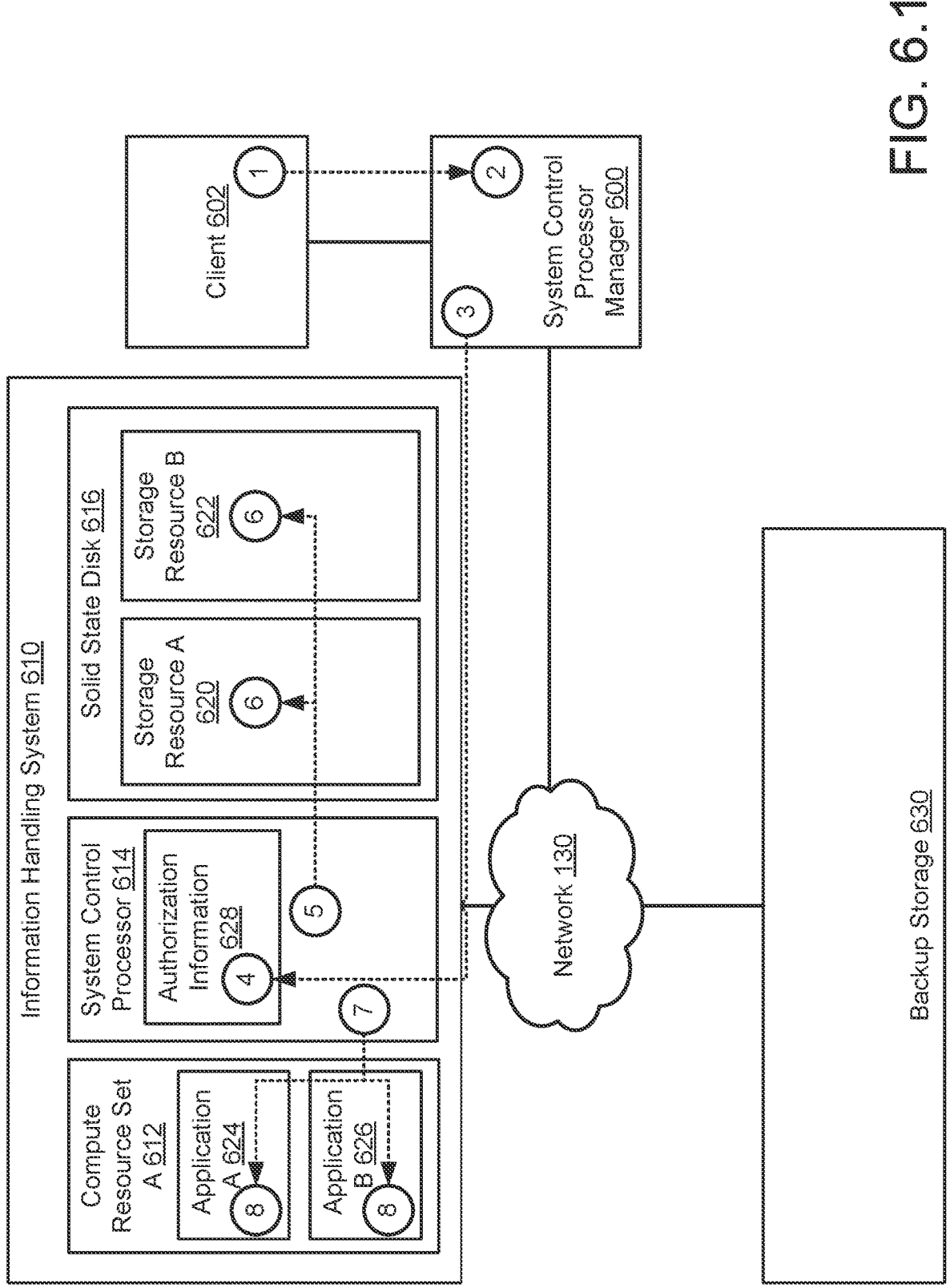
FIG. 6.1

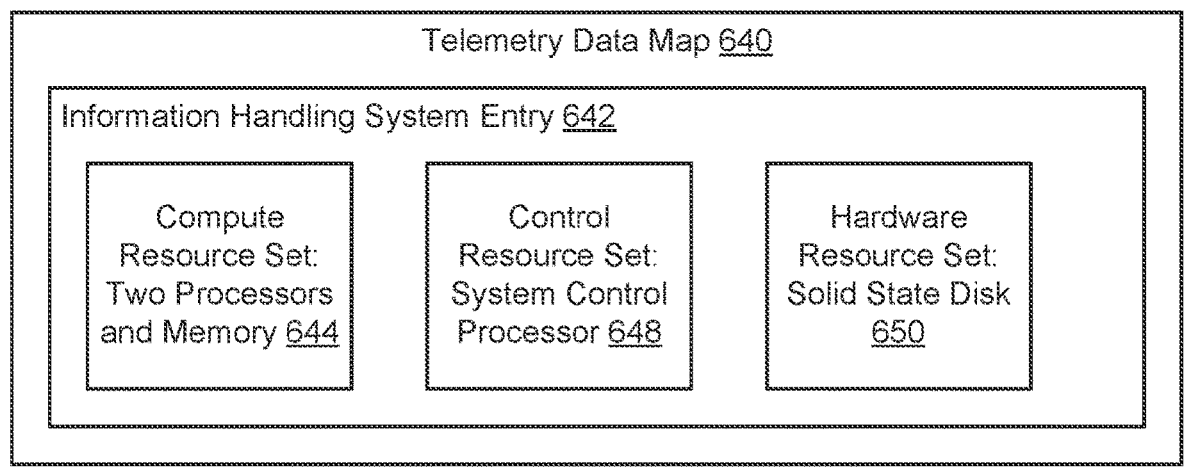
FIG. 6.2

Outcome Based Computing Resource Requirements Lookup Table 660

Database Application Entry 662
- Compute Resources: One Processor, One Gigabyte Memory 664
- Control Resources: Storage Management 666
- Hardware Resources: One Terabyte Storage 668

Email Application Entry 670
- Compute Resources: One Processor, One Gigabyte Memory 672
- Control Resources: Storage Management 674
- Hardware Resources: One Terabyte Storage 676

FIG. 6.3

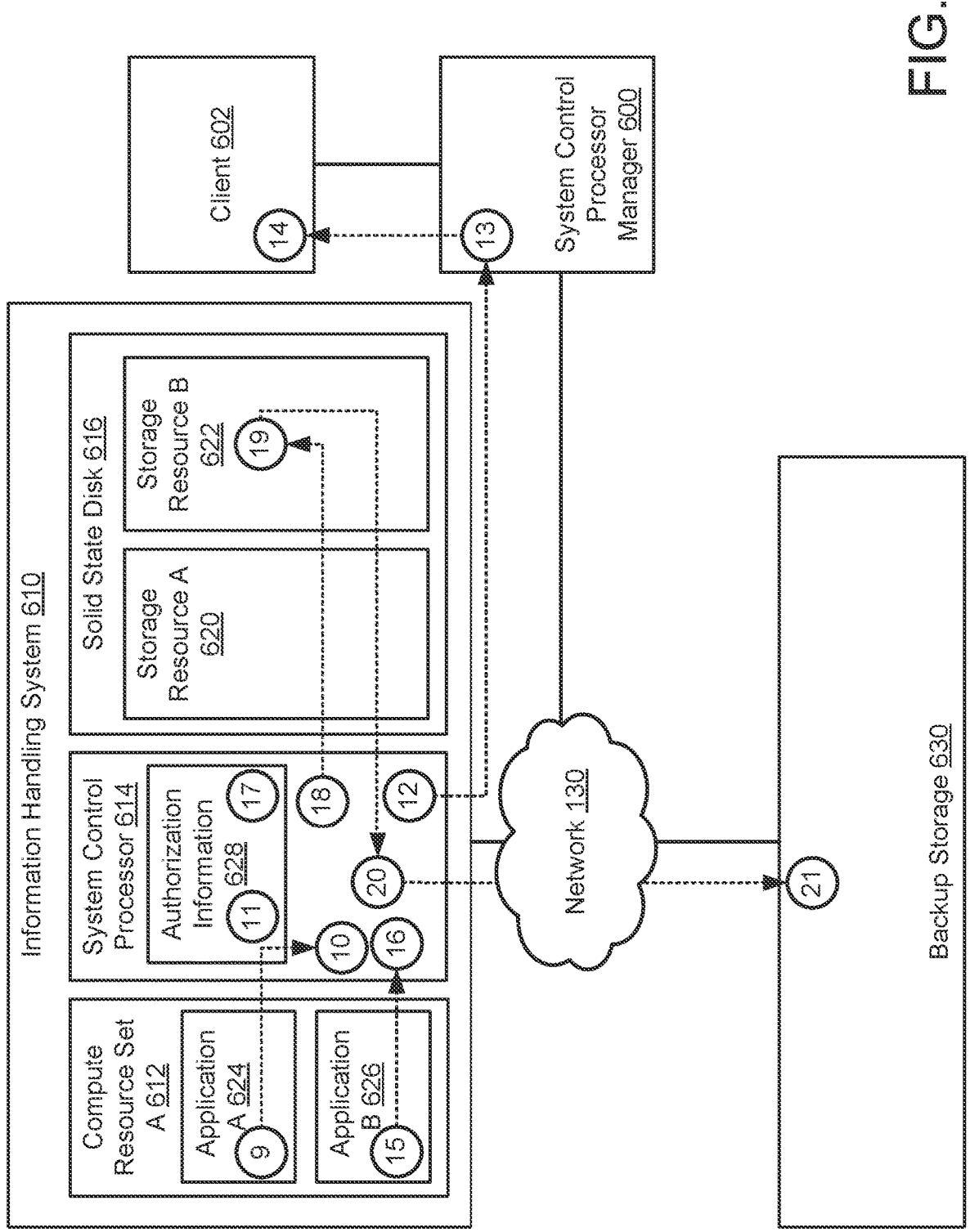
FIG. 6.4

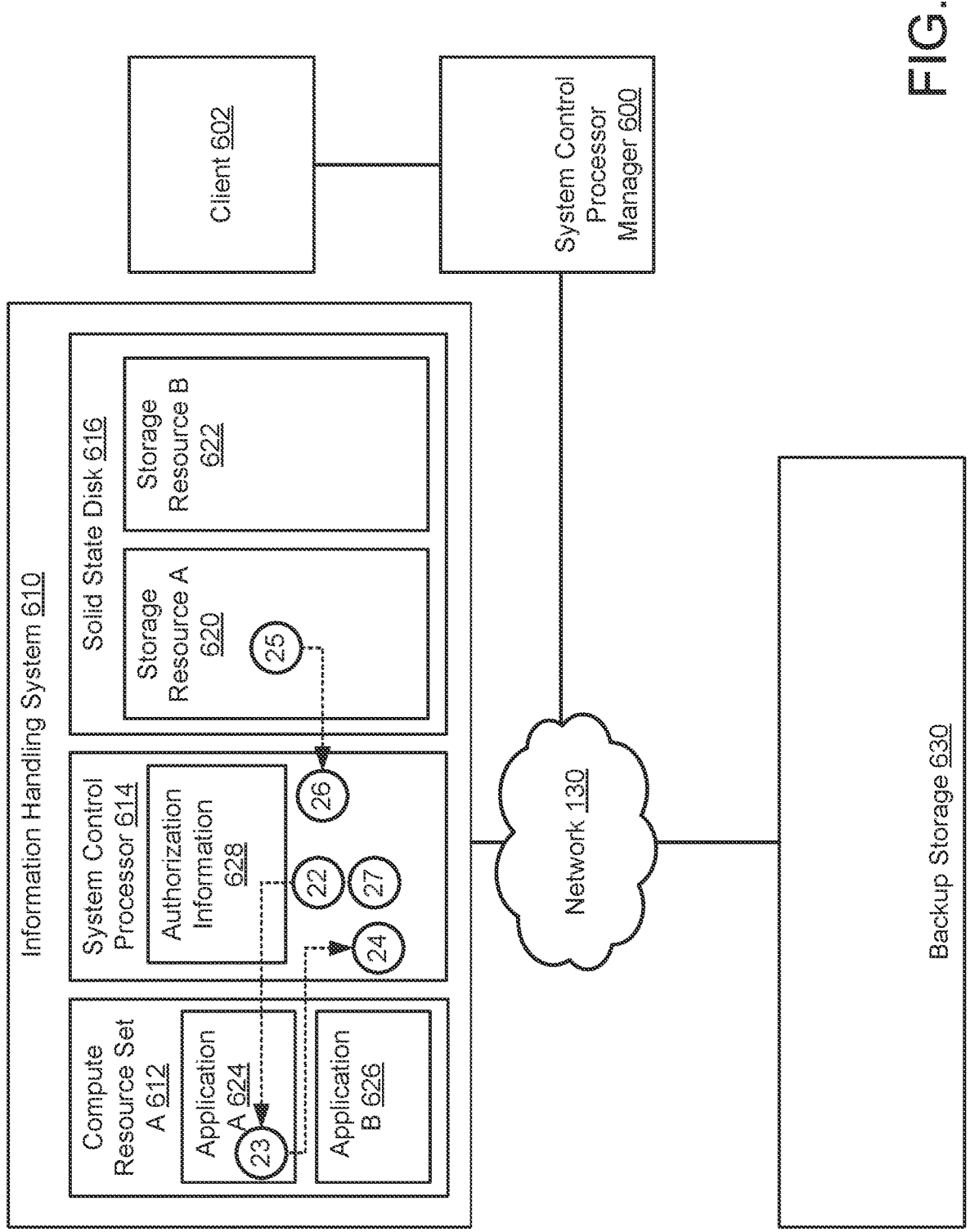
FIG. 6.5

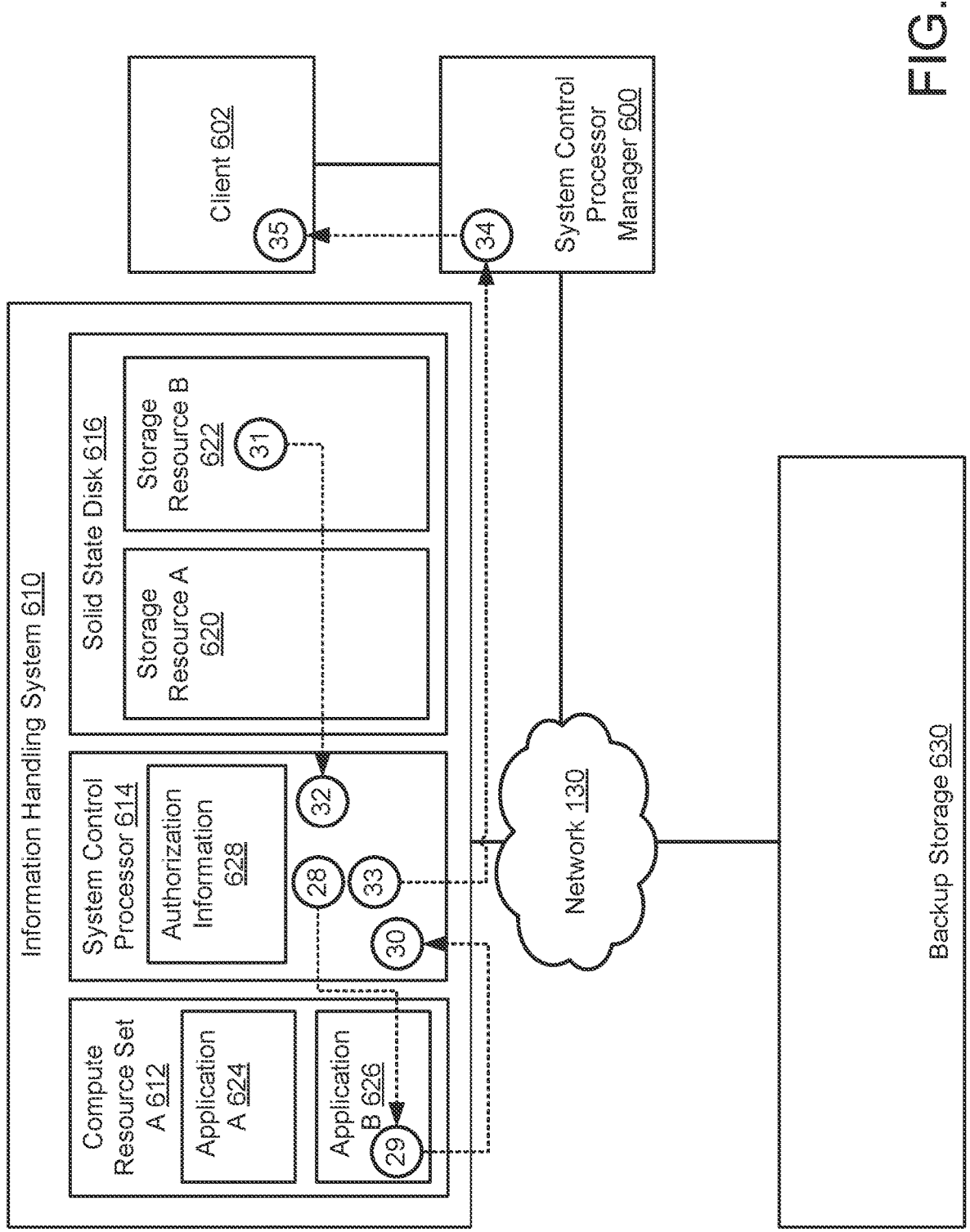
FIG. 6.6

METHOD AND SYSTEM FOR LIMITING DATA ACCESSIBILITY IN COMPOSED SYSTEMS

BACKGROUND

Computing devices may provide services. To provide the services, the computing devices may include hardware components and software components. The services provided by the computing devices may be limited by these components.

SUMMARY

In one aspect, a system for managing composed information handling systems to manage access to data by applications hosted by the composed information handling systems in accordance with one or more embodiments of the invention includes storage for storing authorization information and a system control processor manager that instantiates a composed information handling system of the composed information handling systems using an at least one compute resource set that hosts at least one of the applications and at least one hardware resource set that stores a portion of the data, associates, using the authorization information, storage areas of the at least one hardware resource set with the applications to obtain storage area associations, obtains a data access request from the at least one compute resource set for the portion of the data which is stored in a storage area of the storage areas, makes a determination, based on the storage area associations and an initiator of the data access request, that the initiator of the data access request is not authorized to access the portion of the data, and refuse to service the data access request.

In one aspect, a method for managing composed information handling systems to manage access to data by applications hosted by the composed information handling systems in accordance with one or more embodiments of the invention includes instantiating a composed information handling system of the composed information handling systems using an at least one compute resource set that executes hosts at least one of the applications and an at least one hardware resource set that stores a portion of the data, associating, using authorization information, different storage areas of the at least one hardware resource set with the applications to obtain storage area associations, obtaining a data access request from the at least one compute resource set for the portion of the data which is stored in a storage area of the storage areas, making a determination, based on the storage area associations and an initiator of the data access request, that the initiator of the data access request is not authorized to access the portion of the data, and refusing to service the data access request.

In one aspect, a non-transitory computer readable medium in accordance with one or more embodiments of the invention includes computer readable program code, which when executed by a computer processor enables the computer processor to perform a method for managing composed information handling systems to manage access to data by applications hosted by the composed information handling systems. The method includes instantiating a composed information handling system of the composed information handling systems using an at least one compute resource set that executes hosts at least one of the applications and an at least one hardware resource set that stores a portion of the data, associating, using authorization information, different storage areas of the at least one hardware resource set with the applications to obtain storage area associations, obtaining a data access request from the at least one compute resource set for the portion of the data which is stored in a storage area of the storage areas, making a determination, based on the storage area associations and an initiator of the data access request, that the initiator of the data access request is not authorized to access the portion of the data, and refusing to service the data access request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of instantiating a composed information handling system in accordance with one or more embodiments of the invention.

FIG. 5.2 shows a flowchart of a method of setting up management services in a composed information handling system in accordance with one or more embodiments of the invention.

FIG. 5.3 shows a flowchart of a method of performing management services in accordance with one or more embodiments of the invention.

FIG. 5.4 shows a flowchart of a method of monitoring entities executing on at least one compute resource in accordance with one or more embodiments of the invention.

FIGS. 6.1-6.6 show diagrams of the operation of an example system over time in accordance with one or more embodiments of the invention.

DETAILED DESCRIPTION

Figure 2:
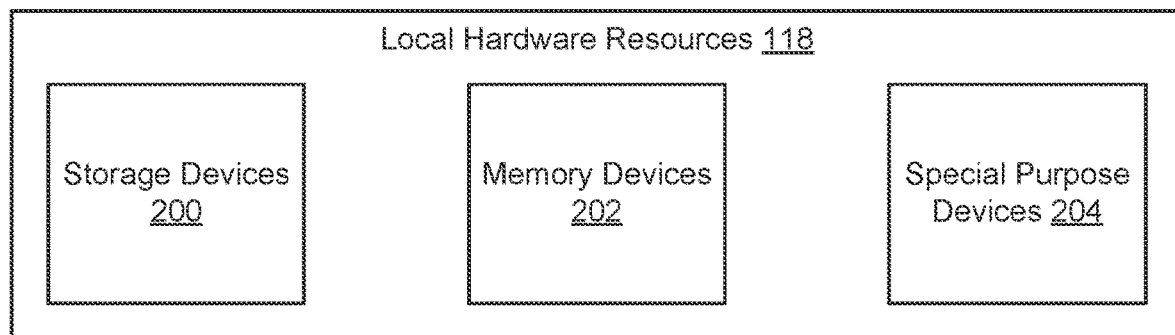
FIG. 2 shows a diagram of local hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for management services directed at improving the security of data stored in composed information handling systems. To the management services, computing resources may need to be allocated for the performance of the services. The resources may include, for example, processing resources, memory, resources, storage resources, computing resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests. The composition requests may indicate a desired outcome such as, for example, execution of one or more application, providing of our or more services, etc. The system control processor manager may translate the composition requests into corresponding quantities of computing resources necessary to be allocated to satisfy the intent of the composition requests.

Once the quantities of computing resources are obtained, the system control processor manager may allocate resources of the information handling system to meet the identified quantities of computing resources by instructing system control processors of the information handling systems to prepare to present hardware resources sets of the information handling system to compute resource sets of the information handling systems.

Additionally, during the preparation of the hardware resource sets, the system control processor manager may instruct the system control processors to manage the hardware resources of the hardware resource sets and perform data protection services. However, when the system control processors present aforementioned resources to the compute resource sets, the system control processors may present the resources as bare metal resources while managing them in more complex manners i.e., perform management services for the composed information handling system, thereby rendering the performance of at least a portion of the management services transparent to the compute resource sets and the entities executing on the compute resource sets.

By doing so, embodiments of the invention may management services using system control processors without interrupting and/or hindering the performance of computer implemented services provided by the compute resource set and entities executing on the compute resource set. Consequently, even though the resulting composed information handling system control plane may be unaware of the implementation of the management services provided by the system control processors, the composed information handling systems may still operate in accordance with management services, thereby improving the security of the data stored in composed information handling systems.

Management services may include intercepting bare metal communications associated with accessing hardware resources from applications executing on compute resource set. The system control processors may use authorization information to determine whether the applications have the necessary authorization to access the hardware resources, based on the determination, grant access and service the bare metal communication or reject the bare metal communication and perform remediation action set. Additionally, the management services may include monitoring, by system control processors, applications executing on compute resource sets to identify potentially compromised applications. Embodiments of the invention therefore enable system control processors to manage access of hardware resources by application and to identify potentially compromised applications, resulting in improved security of data stored in composed information handling systems.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 22) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

Performing the computer implemented services may result in the generation of data. The data may be may be important to the system and/or a user or the system and may be required to be stored for protection and/or restoration purposes. The data may be stored for other and/or additional purposes without departing from the invention. Storing the data in the hardware devices of the system may be problematic because compromised applications may access data stored in hardware resources that the applications are not authorized to access. This may result in data loss/corruption or a breach of data by malicious users of the composed information handling systems.

In general, embodiments of the invention relate to system, methods, and devices for managing the hardware resources of the information handling systems (22) and/or other resources (e.g., external resources (30)) to provide data protection services for data generated by the system. The hardware resources of the information handling systems (22) may be managed by instantiating one or more composed information handling systems using the hardware resources of the information handling systems (22), external resources (30), and/or other types of hardware devices operably connected to the information handling systems (22). During the instantiation of the composed information handling systems, one or more devices, including a system control processor, may be automatically setup to management services for the composed information handling system, including the generation of backups of data, further protecting data stored in the composed information handling systems. Consequently, data protection services may be provided to the composed information handling systems in an efficient and unified manner, resulting in the increased protection of data generated through the performance of computer implemented services by the composed information handling systems.

In one or more embodiments of the invention, the system includes a system control processor manager (50). The system control processor manager (50) may provide composed information handling system composition services. Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities an types of computing resource may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, management of access of storage resources, and/or other services while presenting the resources as bare metal resources. Consequently, these services may be transparent to at least a portion of the applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may be provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

In one or more embodiments of the invention, the system of FIG. 1.1 includes backup storages (70) that provide data storage services to the composed information handling systems. The backup storages (70) may include any number of backup storages, for example, the backup storages (70) may include backup storage A (72) and backup storage N (74). The data storage services may include storing of data provided by the composed information handling systems and providing previously stored data to the composed information handling systems. The data stored in backup storages (70) may be used for restoration purposes. The data stored in the backup storages (70) may be used for other purposes without departing from the invention. The data stored in backup storages (70) may include backups generated during the performance of data protection services of the composed information handling systems. The backups may be any type of backup (e.g., snapshot, incremental backup, full backup, etc.) without departing from the invention. The data stored in backup storages (70) may include other and/or additional types of data obtained from other and/or additional components without departing from the invention.

The system of FIG. 1.1 may include any number of information handling systems (e.g., 62, 64), any number of external resources (e.g., 32, 34), any number of backup storages (e.g., 72, 74), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The system control processor manager (50), information handling systems (60), backup storages (70), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), backup storages (70), and/or external resources (30) described in this application and/or all, or a portion, of the methods illustrated in FIGS. 5.1-5.3. The system control processor manager (50), information handling systems (60), backup storages (70), and/or external resources (30) may be implemented using other types of computing devices without departing from the invention. For additional details regarding computing devices, refer to FIG. 7.

While the information handling systems (60) have been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and perform management services. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated. Additionally, the control resource set (108) may prepare hardware resource sets (e.g., 110) or other computer resources (e.g., system control processors (114)) to perform management services.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114).

The system control processors (114) of the hardware resource set (110) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may managing presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (120).

In an additional example, the system control processors (114) may be operably connected to external resources via hardware resources interface (116) and network (130). The system control processors (114) may prepare and present the external resources as bare metal resources to the compute resource set (120).

Figure 3:
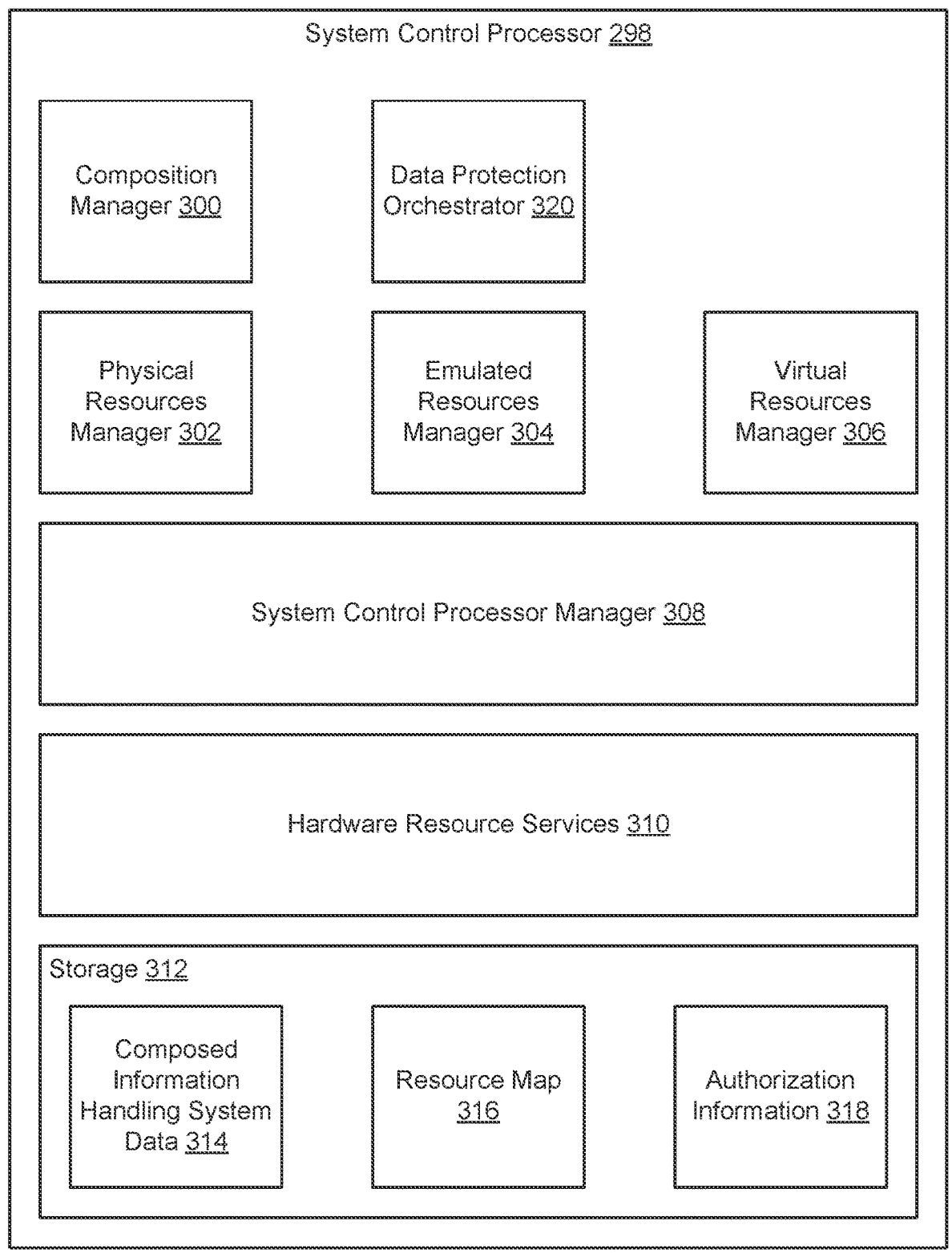
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (120), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.3. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices, or a portion thereof, may be associated with an application hosted by the composed information handling system, where only the associated application is authorized to access the storage device or storage resource. The system control processors or other entities may manage the access of the storage devices (200) through the performance of management services. In other words, the system control processor may reject or accept requests to access storage devices (200) by applications based on authorization information. The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including access management models. The models may include other models such as, for example, security models, workload performance availability models, reporting models, etc. The data protection models may include performing data protection services for data generated by the composed information handling system.

In one or more embodiments of the invention, the management services include intercepting bare metal communications directed to access storage resources directed toward accessing logical hardware resources (118). The system control processors may obtain authorization information associated with applications executing on composed information handling system that may specify the storage resources included in the hardware resource set that the applications may access. The system control processors may accept or reject the bare metal communications based on the authorization information. The management services may also include monitoring applications of the composed information handling systems to identify potentially compromised applications. The management services may include other types of services such as deduplication, erasure coding, compression, and other and/or additional services without departing from the invention. For additional information regarding the performance of management services, refer to FIGS. 5.3-5.4.

To perform the aforementioned management services, during the instantiation of a composed information handling system, the system control processor manager may prepare one or more system control processors and generate authorization information to be used to provide the management services. The system control processor manager may instruct the one or more system control processors to manage the access of storage resources and monitor application executing on the composed information handling system.

The manner of operation of these devices i.e., the performance of the aforementioned management services, may be transparent to at least a portion of the computing resource sets utilizing these hardware devices for providing computer implemented services. Consequently, even though the resulting composed information handling system control plane may be unaware of the implementation of these models, the composed information handling systems may still operate in accordance with these models thereby providing management services for composed information handling systems.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services and to provide data protection services to the composed information handling system.

To instantiate and operate composed information handling systems, the system control processor (298) may include a composition manager (300), a physical resources manager (302), an emulated resources manager (304), a virtual resources manager (306), a data protection orchestrator (320), a system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) manage the operation of the composed information handling systems by, for example, providing management services using authorization information, (vii) add/remove/modify resources presented to the compute resource sets of composed information handling systems dynamically in accordance with workloads being performed by the composed information handling systems, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, data protection services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these command and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk.

Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

To provide the aforementioned management services, the system control processor (298) may include the data protection orchestrator (320). The data protection orchestrator may include the functionality to perform the management services. The data management services may include (i) obtaining authorization information from the system control processor manager (e.g., 50, FIG. 1.1), (ii) intercepting bare metal communications from applications executing on the composed information handling system associated with accessing a storage resource of the hardware resource sets, (iii) accepting the bare metal communications based on the authorization information and performing reads/writes to and from the storage resource and the application, (iv) rejecting bare metal communications based on the authorization information and performing a remediation action set, (v) identifying monitoring trigger events associated with applications hosted by the composed information handling system, (vi) determining whether the applications are potentially compromised using generated fingerprints and previously generated fingerprints associated with the applications, and (vii) performing a remediation action set the determination that the applications are potentially compromised applications. The management services may include other and/or additional types of services (e.g., deduplication, erasure coding, compression, replication, etc.) without departing from the invention. For additional information regarding the data protection services, refer to FIGS. 5.3-5.4. Other components of the system control processor (298) (e.g., composition manager (300)) may perform all, or a portion, of the management services without departing from the invention.

The functionalities of the physical resources manager (302), emulated resources manager (304), virtual resources manager (306), and the data protection orchestrator (320) may be utilized in isolation and/or combination to provide bare metal resources to compute resource sets and to provide management services to the composed information handling system. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding 10 from compute resource sets to hardware devices), bare metal resource addressing of virtualized resources, and/or as emulated resources compatible with the hardware components of the compute resource set.

The functionality of the physical resources manager (302), emulated resources manager (304), virtual resources manager (306), and the data orchestration manager (320) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and the data protection orchestrator (320) and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the system control processor manager (308).

When providing their functionalities, any of the aforementioned components of the system control processor (298) may perform all, or a portion, methods illustrated in FIGS. 5.1-5.4.

The system control processor (298) may be implemented using computing devices. The computing devices may be, for example, an embedded computing device such a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.4. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), data protection orchestrator (320), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), data protection orchestrator (320), system control processor manager (308), and/or hardware resource services (310). The composition manager (300), physical resources manager (302), emulated resources manager (304), virtual resources manager (306), data protection orchestrator (320), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), data protection orchestrator (320), system control processor manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), data protection orchestrator (320), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316) and authorization information (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The authorization information (318) may be implemented using one or more data structures that includes data generated by and/or obtained from the system control processor manager during the instantiation of the composed information handling system. The authorization information (318) may include application identifiers (e.g., a unique global bit string) associated with applications executing in the composed information handling system, storage area identifiers (e.g., a unique global bit string associated with a storage area), and mappings of storage resources associated with each storage area identifier that specify the storage resources of the at least one hardware resource set included in a storage area. Each storage area identifier may be associated with an application identifier. The authorization information (318) may include other and/or additional information associated with applications and associated storage area associations of the composed information handling system without departing from the invention. The authorization information (318) may be updated by the system control processor manager and/or the system control processor (298) when computing resources and/or applications are added/removed/modified from the composed information handling system. The system control processor (298) and/or the system control processor manager may use the authorization information (318) to manage the access of storage resources by applications in the composed information handling system.

While illustrated in FIG. 3 as being stored locally on the storage (312) of the system control processor (298), the composed information handling system data (314), resource map (316), and the authorization information (318) may be stored remotely and may be distributed across any number of devices including storage devices of the hardware resource set of the composed system without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
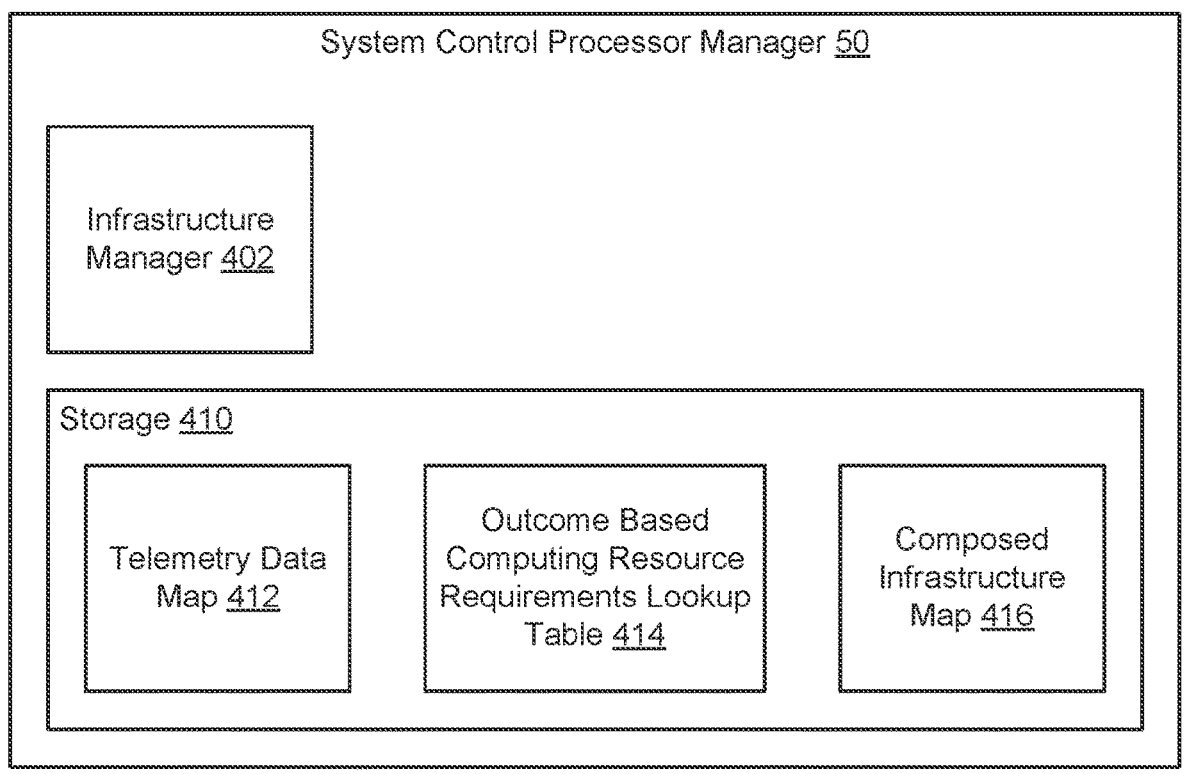
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402) and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over time to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.4.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414) and the composed infrastructure map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1 shows a method that may be performed by components of the system of FIG. 1.1 to manage composed information handling systems.

FIG. 5.1 shows a flowchart of a method in accordance with one or more embodiments of the invention. The method depicted in FIG. 5.1 may be performed to provide computer implemented services using a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operably connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources. The list of computing resources may include computing resources to be used to provide data protection services. The list of computing resources may specify one or more storage resources applications to be executed by the composed information handling system.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The composition request may specify that management services are to be provided to the computing resources of the composed information handling system. The management services may include generating authorization information and managing the access of storage resources based on the authorization information using one or more system control processors. The management services may also include monitoring application executing on the composed information handling system to identify any potential compromises. The methods employed by the system control processors may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, computing resources from other information handling systems to compute resource set(s) of the composed information handling system.

In one or more embodiments of the invention, the composition request specifies a desired outcome. The desired outcome may be, for example, computer implemented services to be provided in response to the composition request. In another example, the desired outcome may be a list of applications to be hosted in response to the composition request. In other words, the composition request may specify a desired outcome without specifying the resources that are to be used to satisfy the requests, the methods of managing the resources, models employed to provide for data protection/integrity/security/etc. Such a composition request may be referred to as an intent based composition request.

In step 502, at least one compute resource set having computing resources specified by the composition request is identified. The at least one compute resource set may be identified by matching the computing resources specified by the composition request to at least one compute resource set having those resources using a telemetry data map (412, FIG. 4).

For example, the telemetry data map (412, FIG. 4) may specify a list of compute resource sets, identifiers of control resource sets that manage the listed compute resource sets, the hardware devices of the listed compute resource sets, and characteristics and information regarding the compute resource set (e.g., memory size, storage size). By matching the computing resources specified by the composition request to the hardware devices specified in the list, the compute resource set corresponding to the listed hardware devices may be identified as the at least one compute resource set.

If no compute resource set includes all of the computing resources specified by the composition request, multiple compute resource sets having sufficient hardware devices to meet the computing resources specified by the composition request may be identified as the at least one compute resource set.

In step 504, at least one hardware resource set having hardware resources specified by the composition request is identified. The at least one hardware resource set may be identified similarly to that described with respect to the identified of the at least one compute resource set of step 502. For example, the computing resources requirements specified by the composition request may be matched to compute resource sets.

In step 506, management services for the hardware resources are setup using at least one control resource set to obtain logical hardware resources managed by the at least one control resource set. The management services may include, for example, virtualization, emulation, abstraction, indirection, duplicative writes, managing access to storage resources, monitoring for potential compromises of applications and/or other type of services to meet the requirements of data integrity, security, and/or management models. The control resource set may provide management services to the at least one hardware resource set identified in step 506.

The management services may be setup for the hardware resource set using the at least one control resource set to obtain logical hardware resources via the method of FIG. 5.2 without departing from the invention.

In step 508, the logical hardware resources are presented to the at least one compute resource set as bare metal resources using the at least one control resource set to instantiate the composed information handling system to service the composition request.

To present the logical hardware resources, the system control processor manager may instruct the system control processors of the at least control resource set to make the bare metal resources discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services.

The method may end following step 508.

Using the method illustrated in FIG. 5.1, a composed information handling system may be formed using computing resources from one or more information handling systems and/or external resources may be obtained.

Following step 508 of FIG. 5.1, no applications may be presently executing on the composed information handling system. The composed information handling systems may then be turned over to other entities for management (e.g., orchestrators) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the steps illustrated in FIG. 5.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The resource maps maintained by the system control processor manager may be similarly updated.

Turning to FIG. 5.2, FIG. 5.2 shows a flowchart of a method of setting up management services in accordance with one or more embodiments of the invention. The method of FIG. 5.2 may be performed to setup management services for the hardware resource set using at least one control resource set to obtain logical hardware resources. The method shown in FIG. 5.2 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 520, authorization information associated with the at least one compute resource set is generated. As discussed above, the composition request may specify one or more applications to be executed by the composed information handling system and the computing resource requirements for hosting the aforementioned applications. The resource requirements may specify one or more storage requirements for the applications. The system control processor manager may generate application identifiers associated with each application to be executed by the composed information handling system. The system control processor manager may associate the application identifier with the storage requirements associated with each application to generate authorization information. The authorization information may be generated via other and/or additional methods without departing from the invention.

In step 522, the at least one hardware resource set is allocated to service the at least one compute resource set based on the authorization information. In one or more embodiments of the invention, the system control processor manager allocates the storage resources of the at least one hardware resource set to meet the storage requirements associated with each application to be executed by the at least one compute resource set as specified by the authorization information. The storage resources may be physical storage devices, virtualizations of physical storage devices, emulations of physical devices, and other types of storage devices. The system control processor manager may allocate storage areas of the storage resources to each application. The storage areas may be allocated based on the hardware resources (e.g., physical storage devices) of the at least one hardware resource set, at least one logical unit number associated with a storage resource of the at least one hardware resource set, at least one file system associated with the at least one hardware resource set, at least one directory associated with the at least one hardware resource set, and/or other types of allocations of storages areas associated with storage resources without departing from the invention. Each storage area may include one or more of the aforementioned storage resource allocations. The system control processor manager may update the authorization information to specify the storage area associated with each application identifier. The system control processor manager may provide the authorization manager to the at least one control resource set to perform management services when instantiating the composed information handling system.

A logical unit number may be a unique identifier (e.g., a bit string) associated with one or more physical or virtual storage devices. A file system may be an organizational data structure associated with one or more storage devices of the at least one hardware resource set that tracks the data stored in the associated storage devices. The file system may specify references to one or more files that include data stored in the associated storage devices. A directory may be an organizational data structure associated with one or more storage devices of the at least one hardware resource set and may include references to file systems and/or other directories stored in the storage devices.

The at least one hardware resource set may be allocated to service the at least one compute resource set based on the authorization information via other and/or additional methods without departing from the invention.

In step 524, the at least one control resource is prepared to provide management services based on the authorization information. To prepare the at least one control resource set to perform the management services, the system control processor manager may cooperate with the at least one control resource set. For example, the system control processor manager may generate instructions for implementing the management services, encapsulate the instructions in a message, and send the message to one or more system control processors of the at least one control resource set. In response to receiving the message, the system control processors may implement the instructions thereby implementing any number of management services such as managing access of storage resources and monitoring applications executing on the at least one compute resource set, etc.

The system control processor manager may also include identification information for the system control processors that will cooperate in presenting resources as part of instantiating a composed information handling system and performing management services. Consequently, the system control processors of control resource sets that will facilitate bare metal presentation of resources to processors of compute resource sets of the composed information handling system and perform management services may be able to identify each other, communicate with one another, etc.

Setting up management services for the hardware resource set may include, for example, preparing translation, indirection, or abstraction tables used to translate logical addresses provided by compute resource sets to physical addresses utilized by hardware devices of the hardware resource.

In another example, setting up management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing data protection services and management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up management services may further include modifying the operation of one or more devices to provide data protection functionality. Other functionalities may include, for example, data integrity functionality (e.g., RAID, ECC, etc.), security functionality (e.g., encryption), and/or other functionalities that are transparent to the composed information handling system.

The at least one control resource set may be prepared to perform management services based on authorization information via other and/or additional methods without departing from the invention.

The method may end following step 524.

Using the method illustrated in FIG. 5.2, management services included data protection services may be setup by preparing the at least one control resource set and the at least one hardware resource set to be presented to the compute resource set as logical hardware resources, and preparing the at least one control resource set to provide management services that are transparent to at least a portion of the compute resource set.

Turning to FIG. 5.3, this figure shows a flowchart of a method in accordance with one or more embodiments of the invention. The method depicted in FIG. 5.3 may be performed to perform management services in accordance with one or more embodiments of the invention. The method shown in FIG. 5.3 may be performed by, for example, a system control processor (e.g., 114, FIG. 1.1) of an information handling system (e.g., 62, FIG. 1.1). Other components of the system in FIG. 1.1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

Prior to step 530, a composed information handling system, including a system control processor, was instantiated based on a composition request via the methods of FIGS. 5.1 and 5.2 discussed above. The composition request may indicate that management services are to be implemented for applications executing on the at least one control resource set of the composed information handling system. The management services may include managing access to storage resources via the method of FIG. 5.3 discussed below. The management services may include other and/or additional services and may be implemented via other and/or additional methods without departing from the invention.

In step 530, a bare metal communication indicating a request to access a hardware resource of the at least one hardware resource is obtained. A compute resource of the compute resource set executing an application of the composed information handling system may send a message to the storage control processor. The message may include a bare metal communication. The bare metal communication may indicate that an application requests to access a hardware resource of the at least one hardware resource set. The bare metal communication may specify a storage resource of the hardware resource set of the composed information handling system in which to access and the application, or initiator, that initiated the bare metal request. The system control processor may intercept the bare metal communication before the bare metal communication is serviced to determine whether to reject the bare metal communication. The bare metal communication indicating a request to access a hardware resource of the at least one hardware resource set may be obtained via other and/or additional methods without departing from the invention.

In step 532, a determination is made as to whether the request matches the authorization information. In one or more embodiments of the invention, the system control processor compares the information included in the bare metal communication with the information included in the authorization information. As discussed above, the bare metal communication may specify the application that sent the bare metal communication and the target storage resource that the application requests access to. The authorization information, as discussed above, includes the storage associations for each application. In other words, the authorization information specifies which storage resources of the at least one hardware resource set are associated with the application. If the authorization information specifies that the application is associated with the storage resource targeted by the bare metal communication, then the system control processor may determine that the request matches the authorization information. If the authorization information specifies that the application is not associated with the storage resource targeted by the bare metal communication, then the system control processor may determine that the request does not match the authorization information. It may be determined whether the request matches the authorization information via other and/or additional methods without departing from the invention.

If the system control processor determines that the request matches the authorization information, then the method proceeds to step 534. If the system control processor determines that the request does not match the authorization information, then the method proceeds to step 536.

In step 534, access is granted to the bare metal communication and management services are performed. In one or more embodiments of the invention, the system control processor performs the management services specified by the bare metal communication. Consequently, the system control processor may write data obtained from the application executing on the at least one compute resource which sent the bare metal communication to the storage resource of the at least one hardware resource set targeted by the bare metal communication. Additionally, the system control processor may obtain data stored in the targeted storage resource of the at least one hardware resource set and provide the data to the application executing on the at least one compute resource which sent the bare metal communication. Other and/or additional management services may be performed without departing from the invention. Access may be granted to the bare metal communication and management services may be performed via other and/or additional methods without departing from the invention.

The method may end following step 534.

In step 536, the bare metal communication is rejected and a remediation action set is performed. As a result, the request included the bare metal communication is not serviced by the system control processor, and a remediation action set is performed. The remediation action set may be one or more data structures stored in persistent storage of the system control processor that specify actions to be performed by the system control processor when a bare metal communication is rejected. The remediation action set may be generated and sent to the system control processor by the system control processor manager during the instantiation of the composed information handling system. The actions specified in the remediation action set may include notifying the system control processor manager of a potentially compromised application, notifying a user of the composed information handling system (e.g., a client) of a potentially compromised application, tagging the application as potentially compromised, waiting for further instructions from the system control processor manager and/or a user of the system, and/or other and/or additional actions without departing from the invention. The bare metal communication may be rejected and the remediation action set may be performed via other and/or additional methods without departing from the invention.

The method may end following step 536.

Using the method illustrated in FIG. 5.3, management services may be performed for a composed information handling system. The management services may be transparent to applications executing on the compute resource set of the composed information handling system. Consequently, the management services provided by the system control processor may be performed without interrupting and/or hindering the computer implemented services provided by the applications executing the compute resource set of the composed information handling system. Therefore, through the performance of the method illustrated in FIG. 5.3, the security of data stored in a composed information handling system may be improved.

Turning to FIG. 5.4, this figure shows a flowchart of a method in accordance with one or more embodiments of the invention. The method depicted in FIG. 5.4 may be performed to monitor entities executing on at least one compute resource in accordance with one or more embodiments of the invention. The method shown in FIG. 5.4 may be performed by, for example, a system control processor (e.g., 114, FIG. 1.1) of an information handling system (e.g., 62, FIG. 1.1). Other components of the system in FIG. 1.1 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

Prior to step 540, a composed information handling system, including a system control processor, was instantiated based on a composition request via the methods of FIGS. 5.1 and 5.2 discussed above. The composition request may indicate that management services are to be implemented for applications executing on the at least one control resource set of the composed information handling system. The management services may include monitoring applications executing on the composed information handling system via the method of FIG. 5.4 discussed below. The management services may include other and/or additional services and may be implemented via other and/or additional methods without departing from the invention.

In step 540, a monitoring trigger event associated with an application executing on the at least one compute resource set is identified. The monitoring trigger event may be that a protection policy obtained from the system control processor manager or another component indicates that an application is to be monitored. A protection policy may be a data structure that includes events and/or conditions which, when identified by the system control processor, indicate that an application is to be monitored. The protection policy may specify (i) a period of time elapsing after which an application is to be monitored to be generated, (ii) a point in time to monitor an application, (iii) the occurrence of a condition precedent such as modification of an application of which a the application is to be monitored, and (iv) any other event and/or condition that may result in the monitoring of the application without departing from the invention. The monitoring trigger event may include other events identified by the system control processor (e.g., obtaining a monitoring request from another component of the system of FIG. 1.1, or rejecting a bare metal communication associated with an application, etc.) without departing from the invention. A monitoring trigger event associated with an application may specify the application that is to be monitored. The monitoring trigger event associated with an application executing on the at least one compute resource may be identified via other and/or additional methods without departing from the invention.

In step 542, a fingerprint of the application executing on the at least one compute resource set is obtained. In one or more embodiments of the invention, the system control processor message to the at least one compute resource set. The message may include a request to generate a fingerprint of the application associated with the monitoring trigger event. In response to obtaining the message, the at least one compute resource set may generate a fingerprint of the application. A fingerprint may be a data structure that includes unique information associated with an application and is generated using a fingerprinting function based on the application. A fingerprinting function may be any mathematical function that maps data of an arbitrary length (e.g., an application image) to a fingerprint of a fixed size. The fingerprint may be compared with a previously generated fingerprint to determine whether the application was unknowingly modified. The compute resource set may send the fingerprint to the system control processor. The fingerprint of the application executing on the at least one compute resource set may be obtained via other and/or additional methods without departing from the invention.

In step 544, a determination is made as to whether the generated fingerprint matches a previously generated fingerprint. In one or more embodiments of the invention, the system control processor compares a previously generated fingerprint generated at a point in time the application was previously modified with the obtained generated fingerprint. The system control processor may store previously generated fingerprints in one or more storage resources associated with the applications. The system control processor may obtain a previously generated fingerprint from a storage resource associated with the application. If the previously generated fingerprint matches the generated fingerprint, then the system control process may determine that the fingerprints match and the application was not unknowingly modified. If the previously generated fingerprint does not match the generated fingerprint, then the system control processor may determine that the fingerprints do not match and that the application was unknowingly modified. The determination as to whether the generated fingerprint matches the previously generated fingerprint may be made via other and/or additional methods without departing from the invention.

If the system control processor determines that the generated fingerprint matches the previously generated fingerprint, then the method may end following step 544. If the system control processor determines that the generated fingerprint does not match the previously generated fingerprint, then the method proceeds to step 546.

In step 546, a remediation action set is performed. The remediation action set may be one or more data structures stored in persistent storage of the system control processor that specify actions to be performed by the system control processor when a bare metal communication is rejected. The remediation action set may be generated and sent to the system control processor by the system control processor manager during the instantiation of the composed information handling system. The actions specified in the remediation action set may include notifying the system control processor manager of a potentially compromised application, notifying a user of the composed information handling system (e.g., a client) of a potentially compromised application, tagging the application as potentially compromised, waiting for further instructions from the system control processor manager and/or a user of the system, and/or other and/or additional actions without departing from the invention. The remediation action set may be performed via other and/or additional methods without departing from the invention.

The method may end following step 546.

Using the method illustrated in FIG. 5.4, management services may be performed for a composed information handling system. The management services may include monitoring applications included in the composed information handling system to identify potentially compromised applications. Through the performance of the method illustrated in FIG. 5.4, the security of data stored in a composed information handling system may be improved.

To further clarify embodiments of the invention, a non-limiting example is provided in FIGS. 6.1-6.6. FIGS. 6.1 and 6.4-6.6 show a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIGS. 6.1 and 6.4-6.6. FIGS. 6.2-6.3 show diagrams of examples of data structures utilized by the example system of FIGS. 6.1 and 6.4-6.6.

Example

Consider a scenario as illustrated in FIG. 6.1 in which a client (602), at step 1, sends a composition request to a system control processor manager (600) that manages an information handling system (610). The composition request specifies that a composed information handling system is to be instantiated to perform a database application workload and an email application workload.

In response to the composition request, the system control processor manager (600), at step 2, identifies computing resources to be allocated to the composed information handling system using the table illustrated in FIG. 6.3. As seen in FIG. 6.3, the outcome based computing resource requirements lookup table (660) includes entries (662, 670) associated with hosting of a database application and an email application.

The database application entry (662) is used by the system control processor manager (600) to ascertain the computing resource requirements for the composed information handling system. For example, the database application entry (662) specifies that a compute resource set (664), control resource set (666) and hardware resource set (668) need to be allocated to the composed information handling system to have the composed information handling system be capable of performing the workload associated with a database application. The compute resource set (664) specified by the entry includes one processor and one gigabyte of memory, the control resource set (666) includes storage management for data generated and stored in the composed information handling system, and the hardware resource set (668) includes one terabyte of solid state disk space. Using the information included in the database application entry (662), the system control processor manager (600) identifies corresponding compute, control, and hardware resource sets for allocation to the composed information handling system using a telemetry data map (640) as illustrated in FIG. 6.2.

The email application entry (670) is used by the system control processor manager (600) to ascertain the computing resource requirements for the composed information handling system. For example, the email application entry (670) specifies that a compute resource set (672), control resource set (674) and hardware resource set (676) need to be allocated to the composed information handling system to have the composed information handling system be capable of performing the workload associated with an email application. The compute resource set (672) specified by the entry includes one processor and one gigabyte of memory, the control resource set (674) includes storage management for data generated and stored in the composed information handling system, and the hardware resource set (676) includes one terabyte of solid state disk space. Using the information included in the email application entry (670), the system control processor manager (600) identifies corresponding compute, control, and hardware resource sets for allocation to the composed information handling system using a telemetry data map (640) as illustrated in FIG. 6.2.

As seen in FIG. 6.2, the telemetry data map (640) includes an entry (642) that specify the resource sets and corresponding hardware devices of these resource sets of the information handling system (IHS) (e.g., 610, FIG. 6.1. For example, the telemetry data map (640) includes an entry (642) associated with the IHS (610, FIG. 6.1) which specifies that the IHS (610, FIG. 6.1) includes a compute resource set (644) that includes two processors and memory, a control resource set (648) that includes a system control processor, and a hardware resource set (650) that includes a solid state disk that has two terabytes of storage space.

Returning to FIG. 6.1, based on the information included in the tables illustrated in FIGS. 6.2 and 6.3, the system control processor manager (600), at step 3, determines that a composed information handling system should be instantiated utilizing compute resource set A (612), the system control processor (614), and the solid state disk (616) of the IHS (610). Furthermore, the system control processor manager (600) determines that the system control processor (614) is to perform storage management services and compute resource set A (612) is to be used to instantiate the database application and the email application. Additionally, the system control processor manager (600) determines the storage area associations associated with the database application and the email application. The storage area associations specify that the database application is associated with a first one terabyte of storage of the solid state disk (616), and the email application is associated with a second one terabyte of storage of the solid state disk (616).

Based on the determinations, a message, at step 4, indicating these resources of the information handling system (610) is sent to the system control processor (614). The message indicates that the compute resource set A (612) and two terabytes of the solid state disk (616) storage space are to be allocated to the composed information handling system. The message also indicates that compute resource set A (612) is to be used to host the database application and the email application, and the system control processor (614) is to provide storage management services. Furthermore, the message includes the storage area associations determined above, and the system control processor (614) generates authorization information (628) using the storage area associations.

In response to the message, at step 5, the system control processor (614) determines that one terabyte of solid state disk A (616) should be presented by virtualizing a terabyte of solid state disk A (616) as storage resource A (620). Additionally, the system control processor (614) determines that another one terabyte of solid state disk A (616) should be presented by virtualizing a terabyte of solid state disk A (616) as storage resource B (622). System control processor A (614) generates a first appropriate address translation table associated with storage resource A (620) to present the one terabyte of storage as storage resource A (620). System control processor A (614) also generates a second appropriate address translation table associated with storage resource B (622). At step 6, the system control processor (614) uses the first and second appropriate address tables to obtain storage resource A (620) and storage resource B (622) from solid state disk A (616). The authorization information (628) specifies that storage resource A (620) is associated with the database application and storage resource B (622) is associated with the email application.

At step 7, the system control processor (614) determines that compute resource set A (612) is to execute the database application and the email application. Based on the determination, the system control processor (614) sends a request to compute resource set A (612) to instantiate the database application and the email application. In response to obtaining the request, at step 8, compute resource set A (612) instantiates application A (624), the database application, and application B (626), the email application. The system control processor (614) presents storage resource A (620A) and storage resource B (622) to compute resource set A (612) as bare metal resources.

Turning to FIG. 6.4, at step 9, application A (624) executing on compute resource set A (612) generates data. Consequently, at step 10, compute resource set A (612) sends the generated data and a bare metal communication to the system control processor (614) indicating that the data is to be written to storage resource B (622).

In response to obtaining the bare metal communication, at step 11, the system control processor (614) compares the bare metal communication request with the authorization information (628) determine if application A (624) is authorized to access storage resource B (622). As discussed above, the authorization information (628) includes the storage area associations generated by the system control processor manager (600) which specifies that application A (624) (i.e., the database application) is only authorized to access storage resource A (620). At step 12, the system control processor (614) determines, based on the authorization information (628), that application A (624) is not authorized to access storage resource B (622). In response to the determination, at step 13, the system control processor (614) sends a message to the system control processor manager (600) that indicates a potential unauthorized attempt to access storage resource B (622) by application A (624) occurred. At step 14, after obtaining the message, the system control processor manager (600) rejects the bare metal communication and notifies the client of the unauthorized attempt to access storage resource B (622) by application A (624).

At step 15, application B (626) executing on compute resource set A (612) generates data. Consequently, at step 16, application B (626) sends a bare metal communication to the system control processor (614) indicating that the data is to be written to storage resource B (622), backed up, and the backup is to be sent to the backup storage (630). In response to obtaining the bare metal communication, at step 17, the system control processor (614) compares the bare metal communication request with the authorization information (628) to determine if application B (626) is authorized to access storage resource B (622). As discussed above, the authorization information (628) includes the storage area associations generated by the system control processor manager (600) which specifies that application B (624) (i.e., the email application) is only authorized to access storage resource B (622). At step 18, the system control processor (614) determines, based on the authorization information (628), that application B (626) is authorized to access storage resource B (622). At step 19, the system control processor (614) writes the data to storage resource B (622). At step 20, the system control processor (614) generates a backup of the data stored in storage resource B (622). At step 21, the system control processor (614) sends the backup to the backup storage (630) where the backup is stored.

Turning to FIG. 6.5, at step 22, the system control processor (614) identifies a monitoring event associated with the application A (624). In response to identifying the monitoring event, at step 23, the system control processor (614) sends a request to generate a fingerprint of application A (624) to compute resource set A (612). At step 24, compute resource set A (612) generates a fingerprint of application A (624) and sends the fingerprint to the system control processor (614). At step 25, the system control processor (614) identifies a previously generated fingerprint of application A (624) from storage resource A (620). At step 26, the system control processor (614) obtains the previously generated fingerprint of application A (624) from storage resource A (620) and compares it with the generated fingerprint. At step 27, the system control processor (614) determines that the fingerprints match and application A (624) was not unknowingly modified.

Turning to FIG. 6.6, at step 28, the system control processor (614) identifies a monitoring event associated with the application B (626). In response to identifying the monitoring event, at step 29, the system control processor (614) sends a request to generate a fingerprint of application B (626) to compute resource set A (612). At step 30, compute resource set A (612) generates a fingerprint of application B (626) and sends the fingerprint to the system control processor (614). At step 31, the system control processor (614) identifies a previously generated fingerprint of application B (626) from storage resource B (622). At step 32, the system control processor (614) obtains the previously generated fingerprint of application B (626) from storage resource B (622) and compares it with the generated fingerprint. At step 33, the system control processor (614) determines that the fingerprints do match and application B (626) was unknowingly modified. In response to the determination, the system control processor (614) sends a notification to the system control processor manager (600) that indicates that application B (626) was unknowingly modified. The system control processor manager determines that application B (626) was potentially modified and sends a notification to the client (602) indicating the potential compromise.

End of Example

Thus, as illustrated in FIGS. 6.1-6.6, embodiments of the invention may provide a system that enables improved security of data stored in a composed information handling system via efficient management of access requests to storage resources of hardware resource sets based on storage area associations and monitoring of applications hosted by the compute resource set to identify potential compromises within the composed information handling system.

Figure 7:
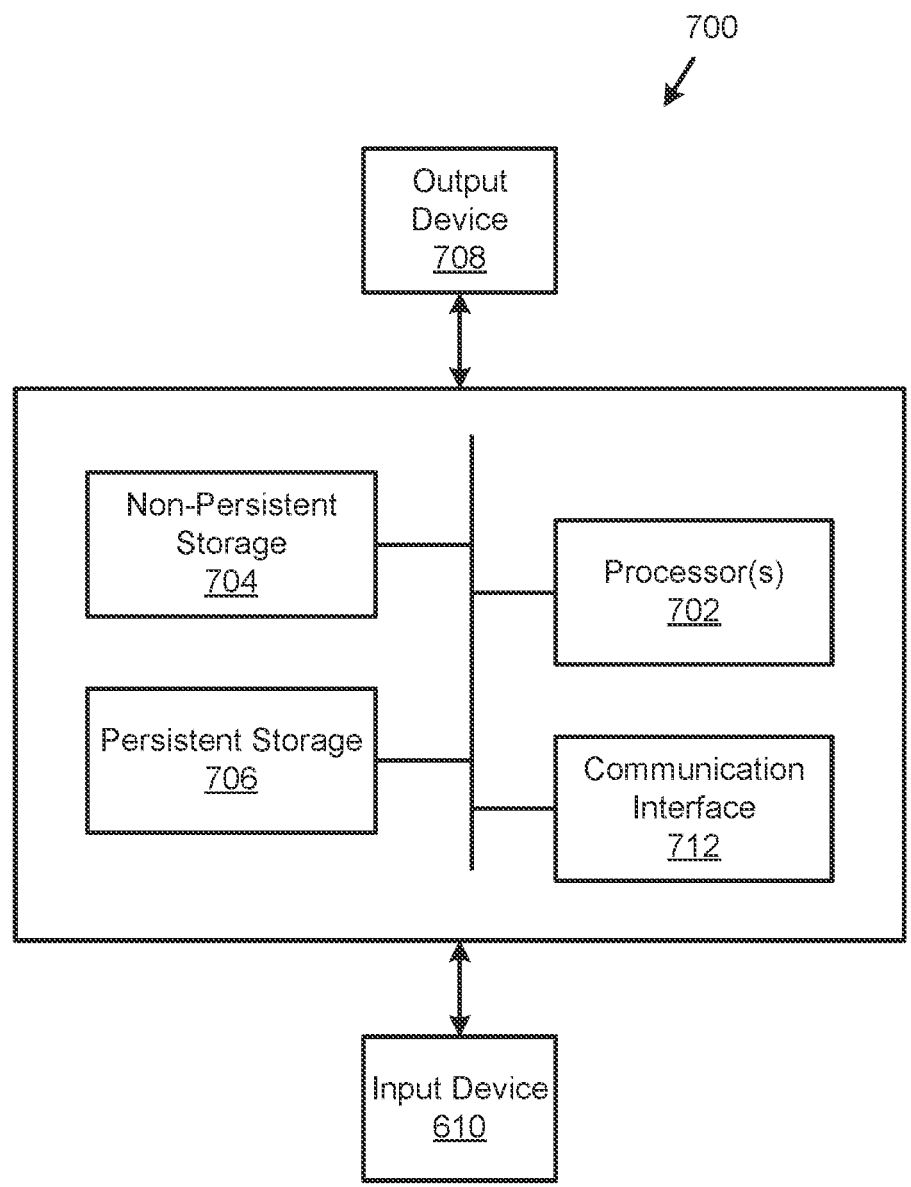
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for performing management services for composed information handling systems. Specifically, embodiments of the invention provide management services using system control processors without interrupting and/or hindering the performance of computer implemented services provided by the compute resource set and entities executing on the compute resource set. Consequently, even though the resulting composed information handling system control plane may be unaware of the implementation of the management services provided by the system control processors, the composed information handling systems may still operate in accordance with management services, thereby improving the security of the data stored in composed information handling systems.

Management services performed by system control processors may include intercepting bare metal communications associated with accessing hardware resources from applications executing on compute resource set. The system control processors may use authorization information to determine whether the applications have the necessary authorization to access the hardware resources, and, based on the determination, grant access and service the bare metal communication or reject the bare metal communication and perform a remediation action set. Additionally, the management services may include monitoring, by system control processors, applications executing on compute resource sets to identify potentially compromised applications. Embodiments of the invention therefore enable system control processors to manage access of hardware resources by application and to identify potentially compromised applications, resulting in improved security of data stored in composed information handling systems.

Thus, embodiments of the invention may address the problem of unauthorized access of data by potentially compromised applications in composed information handling systems through the performance management services. For example, by utilizing a system control processor manager to setup, during the instantiation of a composed information handling system, a system control processor that manages access to storage resources by applications and monitors applications to identify potentially compromised applications through management services, the security of data stored in composed information handling systems may be improved.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for managing composed information handling systems to manage access to data by applications hosted by the composed information handling systems, comprising:
   a storage for storing authorization information; and
   a system control processor manager programmed to:
      instantiate a composed information handling system of the composed information handling systems using an at least one compute resource set that hosts at least one of the applications and at least one hardware resource set that stores a portion of the data;
      associate, using the authorization information, storage areas of the at least one hardware resource set with the applications to obtain storage area associations;
      obtain a data access request from the at least one compute resource set for the portion of the data which is stored in a storage area of the storage areas;
      make a determination, based on the storage area associations and an initiator of the data access request, that the initiator of the data access request is not authorized to access the portion of the data;
      refuse, based on the determination, to service the data access request;
      identify a monitoring trigger event associated with monitoring modifications to the initiator, wherein the monitoring trigger event is the refusal to service the data access request;
      in response to identifying the monitoring trigger event, make a second determination that the initiator was unknowingly modified; and
      perform a remediation action set based on the second determination.

2. The system of claim 1, wherein the storage area associations specify that the initiator is not associated with the storage area.

3. The system of claim 2, wherein the initiator of the data access request is an application of the at least one of the applications.

4. The system of claim 1, wherein the data access request indicates an identity of the initiator and the storage area.

5. The system of claim 1, wherein instantiating a composed information handling system of the composed information handling systems using a compute resource set that executes at least one of the applications and a hardware resource set that stores a portion of the data comprises preparing at least one control resource set to provide management services for the at least one compute resource set and the at least one hardware resource set.

6. The system of claim 5, wherein the at least one control resource set comprises a system control processor.

7. The system of claim 6, wherein the management services comprise:
   intercepting data access requests from the at least one compute resource set by presenting the hardware resource set as bare metal resources; and
   monitoring the applications to identify potentially compromised applications based on the intercepted data access requests and monitoring trigger events.

8. A method for managing composed information handling systems to manage access to data by applications hosted by the composed information handling systems, comprises:
   instantiating a composed information handling system of the composed information handling systems using an at least one compute resource set that executes hosts at least one of the applications and an at least one hardware resource set that stores a portion of the data;
   associating, using authorization information, different storage areas of the at least one hardware resource set with the applications to obtain storage area associations;
   obtaining a data access request from the at least one compute resource set for the portion of the data which is stored in a storage area of the storage areas;
   making a determination, based on the storage area associations and an initiator of the data access request, that the initiator of the data access request is not authorized to access the portion of the data;
   refusing, based on the determination, to service the data access request;
   identifying a monitoring trigger event associated with monitoring modifications to the initiator, wherein the monitoring trigger event is the refusal to service the data access request;
   in response to identifying the monitoring trigger event, making a second determination that the initiator was unknowingly modified; and
   performing a remediation action set based on the second determination.

9. The method of claim 8, wherein the storage area associations specify that the initiator is not associated with the storage area.

10. The method of claim 9, wherein the initiator of the data access request is an application of the at least one of the applications.

11. The method of claim 8, wherein the data access request indicates an identity of the initiator and the storage area.

12. The method of claim 8, wherein instantiating a composed information handling system of the composed information handling systems using a compute resource set that executes at least one of the applications and a hardware resource set that stores a portion of the data comprises preparing at least one control resource set to provide management services for the at least one compute resource set and the at least one hardware resource set.

13. The method of claim 12, wherein the at least one control resource set comprises a system control processor.

14. The method of claim 13, wherein the management services comprise:
   intercepting data access requests from the at least one compute resource set by presenting the hardware resource set as bare metal resources; and
   monitoring the applications to identify potentially compromised applications based on the intercepted data access requests and monitoring trigger events.

15. A non-transitory computer readable medium comprising computer readable program code, which when executed by a computer processor enables the computer processor to perform a method for managing composed information handling systems to manage access to data by applications hosted by the composed information handling systems, the method comprising:

instantiating a composed information handling system of the composed information handling systems using an at least one compute resource set that executes hosts at least one of the applications and an at least one hardware resource set that stores a portion of the data;

associating, using authorization information, different storage areas of the at least one hardware resource set with the applications to obtain storage area associations;

obtaining a data access request from the at least one compute resource set for the portion of the data which is stored in a storage area of the storage areas;

making a determination, based on the storage area associations and an initiator of the data access request, that the initiator of the data access request is not authorized to access the portion of the data;

refusing, based on the determination, to service the data access request;

identifying a monitoring trigger event associated with monitoring modifications to the initiator, wherein the monitoring trigger event is the refusal to service the data access request;

in response to identifying the monitoring trigger event, making a second determination that the initiator was unknowingly modified; and performing a remediation action set based on the second determination.

16. The non-transitory computer readable medium of claim 15, wherein the storage area associations specify that the initiator is not associated with the storage area.

17. The non-transitory computer readable medium of claim 16, wherein the initiator of the data access request is an application of the at least one of the applications.

18. The non-transitory computer readable medium of claim 15, wherein the data access request indicates an identity of the initiator and the storage area.

19. The non-transitory computer readable medium of claim 15, wherein instantiating a composed information handling system of the composed information handling systems using a compute resource set that executes at least one of the applications and a hardware resource set that stores a portion of the data comprises preparing at least one control resource set to provide management services for the at least one compute resource set and the at least one hardware resource set.

20. The non-transitory computer readable medium of claim 19, wherein the at least one control resource set comprises a system control processor.

\* \* \* \* \*